(12) United States Patent
Tomomura

(10) Patent No.: US 9,780,947 B1
(45) Date of Patent: Oct. 3, 2017

(54) COMPUTER PROGRAMS, SECRET MANAGEMENT METHODS AND SYSTEMS

(71) Applicant: ZenmuTech, Inc, Tokyo (JP)

(72) Inventor: Kiyoshi Tomomura, Tokyo (JP)

(73) Assignee: ZenmuTech, Inc, Tokyo (JP)

(*) Notice: Subject to any disclaimer, the term of this patent is extended or adjusted under 35 U.S.C. 154(b) by 0 days.

(21) Appl. No.: 15/629,167

(22) Filed: Jun. 21, 2017

Related U.S. Application Data

(63) Continuation of application No. 15/212,768, filed on Jul. 18, 2016, now Pat. No. 9,722,779.

(30) Foreign Application Priority Data

Jan. 13, 2016 (JP) .................. 2016-004818
Jun. 14, 2016 (JP) .................. 2016-117998
Nov. 2, 2016 (JP) .................. 2016-215044

(51) Int. Cl.
*H04L 29/06* (2006.01)
*H04L 9/06* (2006.01)
*G06F 3/06* (2006.01)

(52) U.S. Cl.
CPC .......... *H04L 9/0625* (2013.01); *G06F 3/0623* (2013.01); *G06F 3/0664* (2013.01); *G06F 3/0685* (2013.01)

(58) Field of Classification Search
CPC H04L 9/085; H04L 9/0847; G06F 2221/2107
See application file for complete search history.

(56) References Cited

U.S. PATENT DOCUMENTS 9,064,127 B2 * 6/2015 O'Hare .................. H04L 9/085
9,251,090 B1 * 2/2016 Borthakur ........... G06F 12/1009
(Continued)

FOREIGN PATENT DOCUMENTS

JP 2007-073004 A 3/2007
JP 2007-140406 6/2007
(Continued)

OTHER PUBLICATIONS

Feb. 20, 2017, KR communication issued for related KR application No. 10-2016-0097238.
(Continued)

*Primary Examiner* — Jason K Gee
(74) *Attorney, Agent, or Firm* — Paratus Law Group, PLLC

(57) ABSTRACT

There is provided a computer program which, when executed by a processor of an information processing device, causes the processor to function as a secret splitting module and a control module. The secret splitting module is configured to recover secret data from at least two pieces of split data using secret splitting and the control module is configured to control reading out or writing each piece of the split data. Secret data is maintained within a virtual drive. The control module is further configured to read out first split meta-data from a first storage device, read out second split meta-data from a second storage device, cause the secret splitting module to recover virtual drive meta-data at least from the first and second split meta-data, and generate the virtual drive based on the recovered virtual drive meta-data. Corresponding method and system are also provided.

8 Claims, 11 Drawing Sheets

(56) References Cited

U.S. PATENT DOCUMENTS

2014/0006798 A1     1/2014    Prakash et al.
2015/0270949 A1*   9/2015    Michiels .................. H04L 9/14
                                                           380/28

FOREIGN PATENT DOCUMENTS

JP         2008-139996       6/2008
KR     10-2014-0128685 A    11/2014
WO     WO2006/114841 A1   11/2006

OTHER PUBLICATIONS

Rivest, "All-Or-Nothing Encryption and The Package Transform", FSE '97 Proceedings of Fast Software Encryption, pp. 210-218, 1997.

* cited by examiner

COMPUTER PROGRAMS, SECRET MANAGEMENT METHODS AND SYSTEMS

CROSS REFERENCE TO RELATED APPLICATIONS

This application is a continuation of U.S. patent application Ser. No. 15/212,768 filed on Jul. 18, 2016, which claims the benefit of Japanese Priority Patent Application JP 2016-004818 filed on Jan. 13, 2016, and Japanese Priority Patent Application JP 2016-117998 filed on Jun. 14, 2016, and this application claims the benefit of Japanese Priority Patent Application JP 2016-215044 filed on Nov. 2, 2016, the entire contents of which are incorporated herein by reference.

BACKGROUND

The present disclosure relates to computer programs, secret management methods and systems.

In recent years, there has been frequent leakage of information managed by corporations, public offices, educational institutions, or other organizations. It is one of the causes that there have been no sufficient mechanisms against illegal access to information or no sufficient mechanisms of preventing users from carelessly leaking information in spite of the fact that the development of information communication technologies made it easier to access information and increased information portability. Not only organizations such as corporations, but individuals are also at risk of information leakage.

The most popular technology of protecting information from security risks is encryption using passwords. Simply encrypting information cannot, however, eliminate the risks of information leakage caused by cracking passwords or encryption keys, or social hacking. It is not either realistic to expect all the end users to strictly manage their passwords. Accordingly, it is the Secret Splitting method (also referred to as Secret Sharing method) that has attracted attention in recent years. According to the Secret Splitting, information is split into a plurality of fragments so as to make it impossible to recover the original information unless a certain number of fragments or more are put together.

JP 2008-139996A proposes a system that uses the secret splitting to prevent information leakage. The information leakage prevention system proposed by JP2008-139996A generates a virtual application image file from an execution file, a driver, and data of an application (AP) used at an information terminal, and splits the virtual AP image file into two or more share files. One of the share files is stored by a mobile terminal that is different from the information terminal. The share file stored by the information terminal can be erased in response to an instruction from a management server when the management server is notified that the information terminal has been lost or stolen.

SUMMARY

The system proposed by JP 2008-139996A, however, applies the secret splitting per the virtual AP image file containing all the files and data related to one or more applications. The virtual AP image file is triggered by a shutdown of the information terminal to be split into a plurality of share files. No file or data is protected until this secret splitting triggered by the shutdown is completed. The virtual AP image file that has been split into a plurality of share files is recovered by a user activating a dedicated application on the information terminal, and stored into a secondary storage device again. For example, when a malicious third person illegally intrudes into the information terminal before the user notices it, the secret information in a virtual AP image file can be relatively easily read out. When the information terminal is stolen before being shut down, it would be inevitable that the secret information leaks. In the system proposed by JP 2008-139996A, as more applications are covered by the virtual AP image file(s), more information is protected. Increase in applications covered by the virtual AP image file(s), however, increases delay in secret splitting processing, and decreases usability. Information on applications which is not covered by the virtual AP image file(s) is not protected.

The technology according to the present disclosure provides a mechanism that eliminates or at least alleviates one or more of the above-described defects in the existing technologies.

According to an aspect of the present disclosure, there is provided a computer program which, when executed by a processor of an information processing device, causes the processor to function as: a secret splitting module configured to recover secret data by combining at least two pieces of split data out of a plurality of pieces of split data that have been formed by splitting the secret data using secret splitting; and a control module configured to control reading out or writing each piece of the plurality of pieces of split data from or into a data area of a corresponding storage device. The control module is further configured to maintain the secret data within a virtual drive, virtual drive meta-data for generating the virtual drive being split at least into first split meta-data and second split meta-data. The control module is further configured to: read out the first split meta-data from a first storage device, the first storage device being an external storage device; read out the second split meta-data from a second storage device that is different from the first storage device; cause the secret splitting module to recover the virtual drive meta-data at least from the first split meta-data and the second split meta-data; and generate the virtual drive based on the recovered virtual drive meta-data.

The control module may be further configured to maintain the secret data within the virtual drive as a file image stored only in a volatile memory.

The control module may be further configured to read out the first split meta-data from a first storage device in response to detecting a connection of the first storage device to the information processing device.

The control module may be further configured to disable the virtual drive when a request for unmounting the virtual drive is detected.

The control module may be further configured to disable the virtual drive when a disconnection of the first storage device from the information processing device is detected.

The control module may be further configured to: generate the virtual drive by registering a setting of the virtual drive onto a file system of the information processing device; and disable the virtual drive by erasing the setting of the virtual drive that was registered onto the file system.

The control module may be further configured to: when activation of a file within the virtual drive is requested, read out at least a first split file and a second split file out of a plurality of split files respectively from the first storage device and the second storage device wherein the plurality of split files have been formed by splitting a file image of the file to be activated using secret splitting; and cause the secret splitting module to recover the file image of the file to be activated at least from the first split file and the second split file.

File meta-data of a file within the virtual drive may be split at least into first split file meta-data and second split file meta-data. The control module may be further configured to: read out the first split file meta-data from the first storage device; read out the second split file meta-data from the second storage device; and cause the secret splitting module to recover the file meta-data at least from the first split file meta-data and the second split file meta-data thereby enabling an indication related to the file within the virtual drive to be displayed.

The activation of the file within the virtual drive may be requested by a user input toward the indication related to the file displayed based on the recovered file meta-data.

The control module may be further configured to, when saving a file within the virtual drive is requested, cause the secret splitting module to split a file image of the file to be saved at least into a third split file and a fourth split file using secret splitting. The third split file may be to be written into the first storage device and the fourth split file may be to be written into the second storage device.

The control module may be further configured to, in response to detection of the request for file saving, write the third split file into the first storage device and write the fourth split file into the second storage device.

The control module may be further configured to: maintain, in the volatile memory, the third split file formed in response to detection of the request for file saving; and, in response to detection of a request for unmount of the virtual drive, write the third split file into the first storage device.

The virtual drive may be generated by registering a setting of the virtual drive onto a file system of the information processing device and the control module may be further configured to detect the request for file saving via the file system.

The secret splitting module may be further configured to: encrypt the secret data by the All or Nothing Transform (AONT) scheme before splitting the secret data; and recover the secret data by decrypting combined data based on the at least two pieces of split data by the AONT scheme to obtain the secret data.

According to another aspect, there is provided a secret management method performed in an information processing device using secret splitting, the secret splitting being capable of forming a plurality of pieces of split data by splitting secret data, and recovering the secret data by combining at least two pieces of split data out of the plurality of pieces of split data. The secret management method includes: reading out first split meta-data from a first storage device, the first storage device being an external storage device; reading out second split meta-data from a second storage device that is different from the first storage device, the first split meta-data and the second split meta-data being data that have been formed by splitting virtual drive meta-data for generating a virtual drive within which the secret data is configured to be maintained; recovering the virtual drive meta-data at least from the first split meta-data and the second split meta-data using secret splitting; and generating the virtual drive based on the recovered virtual drive meta-data.

According to another aspect, there is provided an information processing system including: a secret splitting module configured to recover secret data by combining at least two pieces of split data out of a plurality of pieces of split data that have been formed by splitting the secret data using secret splitting; and a control module configured to control reading out or writing each piece of the plurality of pieces of split data from or into a data area of a corresponding storage device. The control module is further configured to maintain the secret data within a virtual drive, virtual drive meta-data for generating the virtual drive being split at least into first split meta-data and second split meta-data. The control module is further configured to: read out the first split meta-data from a first storage device, the first storage device being an external storage device; read out the second split meta-data from a second storage device that is different from the first storage device; cause the secret splitting module to recover the virtual drive meta-data at least from the first split meta-data and the second split meta-data; and generate the virtual drive based on the recovered virtual drive meta-data.

According to another aspect, there is provided a computer program which, when executed by a processor of an information processing device, causes the processor to function as: a secret splitting module configured to form a plurality of pieces of split data by splitting secret data using secret splitting; and a control module configured to control writing each piece of the plurality of pieces of split data into a data area of a corresponding storage device. Data recovered by combining at least two pieces of split data out of the plurality of pieces of split data is maintained within a virtual drive on a device that has recovered the data. The control module is further configured to: cause the secret splitting module to split virtual drive meta-data for generating the virtual drive at least into first split meta-data and second split meta-data; write the first split meta-data into a first storage device, the first storage device being an external storage device; and write the second split meta-data into a second storage device that is different from the first storage device.

The control module may be further configured to: cause the secret splitting module to split a file image of a file to be recovered within the virtual drive at least into a first split file and a second split file; write the first split file into the first storage device; and write the second split file into the second storage device.

The control module may be further configured to: cause the secret splitting module to split file meta-data of the file to be recovered within the virtual drive at least into first split file meta-data and second split file meta-data; write the first split file meta-data into the first storage device; and write the second split file meta-data into the second storage device. The file meta-data may be used for displaying an indication related to the file within the virtual drive.

According to another aspect, there is provided a secret management method performed in an information processing device using secret splitting, the secret splitting being capable of forming a plurality of pieces of split data by splitting secret data, and recovering the secret data by combining at least two pieces of split data out of the plurality of pieces of split data, the secret management method including: splitting virtual drive meta-data for generating a virtual drive at least into first split meta-data and second split meta-data using secret splitting, the virtual drive being configured to maintain data recovered by combining the at least two pieces of split data out of the plurality of pieces of split data; writing the first split meta-data into a first storage device, the first storage device being an external storage device; and writing the second split meta-data into a second storage device that is different from the first storage device.

According to another aspect, there is provided an information processing system including: a secret splitting module configured to form a plurality of pieces of split data by splitting secret data using secret splitting; and a control module configured to control writing each piece of the plurality of pieces of split data into a data area of a corresponding storage device. Data recovered by combining at least two pieces of split data out of the plurality of pieces of split data is maintained within a virtual drive on a device that has recovered the recovery data. The control module is further configured to: cause the secret splitting module to split virtual drive meta-data for generating the virtual drive at least into first split meta-data and second split meta-data; write the first split meta-data into a first storage device, the first storage device being an external storage device; and write the second split meta-data into a second storage device that is different from the first storage device.

The technology according to the present disclosure can eliminate or at least alleviate one or more of the above-described defects in the existing technologies.

DETAILED DESCRIPTION OF THE EMBODIMENT(S)

Figure 1A:
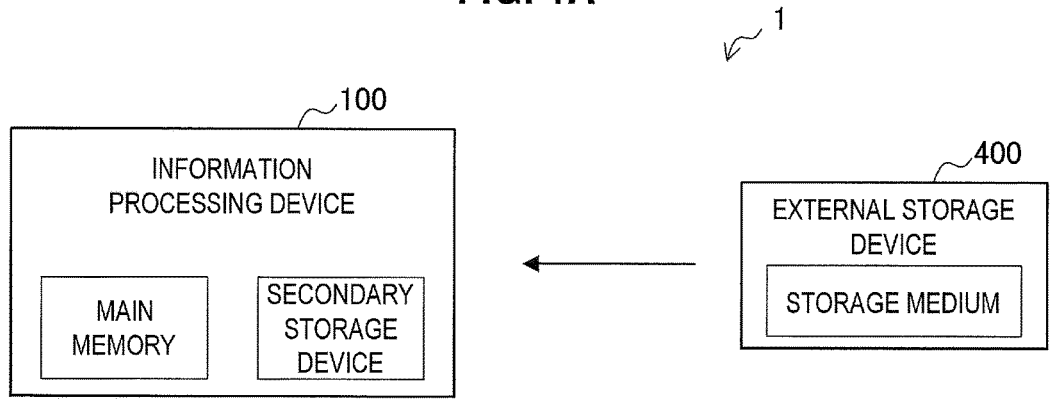
FIG. 1A illustrates an overview of a system to which technology according to the present disclosure can be applied.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Descriptions will now be made in the following order:
1. System Overview
   (1) System configuration examples
   (2) Meaning of terms
2. Device Configurations
   (1) Hardware configuration example
   (2) Data configuration example
   (3) Functional configuration example
3. Flows of Processes
   (1) Virtual drive generation
   (2) File splitting
   (3) Virtual drive recovery
   (4) File recovery
4. Conclusion
5. Modifications
   (1) File splitting—first modification
   (2) File splitting—second modification
   (3) Other modifications 1. System Overview (1) System Configuration Examples FIG. 1A illustrates an overview of a system to which technology according to the present disclosure can be applied. With reference to FIG. 1A, a secret information management system 1 includes an information processing device 100 and an external storage device 400.

The information processing device 100 may be any type of information terminal or electronic device such as a notebook personal computer (PC), a tablet PC, a desktop PC, a smartphone, a cellular phone, a navigation terminal, or a personal digital assistant (PDA). A user may handle data in various forms on the information processing device 100. Data handled on the information processing device 100 includes data that a user or an administrator of the information processing device 100 desires to keep secret (thus, it is referred to as secret data). Secret data may be data in any format such as text, document, communication message, image, video, audio, setting data, or executable file. The information processing device 100 includes a main memory and a secondary storage device. The main memory is typically a volatile memory (such as a random access memory (RAM)). The secondary storage device may be, for example, a hard disk drive (HDD) or a solid state drive (SSD), which includes a nonvolatile storage medium.

The external storage device 400 is a storage device that is connected to the information processing device 100 via some connection interface of the information processing device 100. The external storage device 400 includes a nonvolatile storage medium. The external storage device 400 may be a peripheral device such as a universal serial bus (USB) memory, an integrated circuit (IC) card, a memory card (such as an SD card), or an external HDD, mainly for the purpose of storing information. Alternatively, the external storage device 400 may be a similar type of information terminal or electronic device to the information processing device 100 such as a PC or a smartphone. Moreover, the external storage device 400 may also be a network device such as a network attached storage (NAS), a cloud server, or a data server, which can be accessed via a network such as the Internet or a local area network (LAN). The external storage device 400 may have a wired or wireless connection to the information processing device 100. A connection interface of the information processing device 100 may be an interface in any form such as a connection terminal, a connector that accepts a connection cable, or an antenna and a radio frequency (RF) front-end.

In some embodiments discussed below, secret data protected by the technology according to the present disclosure is split into N pieces of split data (where N represents an integer greater than or equal to 2) using secret splitting. At least one of the N pieces of split data is then written into the external storage device 400. Secret data is created, viewed, and updated within a virtual drive generated on the information processing device 100. Secret data is not present as an actual file stored by a nonvolatile memory, but is maintained as a file image stored only in a volatile memory (typically, main memory). The virtual drive is generated in a state that the external storage device 400 is connected to the information processing device 100, and disappears in response to unmount of the virtual drive or the disconnection of the external storage device 400. As an example, virtual drive meta-data for generating the virtual drive is also split into a plurality of pieces of split meta-data using secret splitting, and at least one of these pieces of split meta-data is written into the external storage device 400. This means that the virtual drive, which provides space for a user to handle secret data, is not generated unless the external storage device 400 is connected to the information processing device 100, and that virtual drive itself is also protected by secret splitting. For example, a conventional technique of splitting only secret data using secret splitting does not protect data that is first being created and has not yet been split. If a user has to frequently execute secret splitting processing while data is being created, such an operation is troublesome to the user. In contrast, according to the embodiment described herein, the virtual drive that provides space for a user to handle secret data is protected by secret splitting. In other words, as long as work is conducted using a virtual drive as a workspace, data is protected from the beginning of the work.

Further, a conventional technique of splitting a comprehensive data set including a driver, data, and an execution file of an application as a single image requires large-scale image data to be encrypted and decrypted every time the application is handled, which causes significant delay in processing. To reduce the size of image data, applications to be protected have to be decreased. In contrast, according to the embodiment described herein, data within the virtual drive can be handled by any type of application. Meta-data and a file within the virtual drive can be separately processed, resulting in only a slight delay in processing.

Furthermore, a technique of splitting only data related to a specific application or a specific type of data using secret splitting requires a user or a system administrator to appropriately set up protection targets in advance. In the event that such protection targets are inappropriately set up or no protection targets are set up, secret data that should be protected will be at risk of leakage. In reality, users are often unwilling to conduct even easy work such as setting or updating a password, and the load imposed on the users for the purpose of security is thus desirably as light as possible. In this regard, according to the embodiment described herein, a user is allowed to use the virtual drive through an intuitive action of connecting the external storage device 400 to the information processing device 100. Once the virtual drive is generated, the user can then handle secret data within the virtual drive like conducting normal work in a data area on a typical information terminal. Furthermore, the user can unable a third person to access to the secret data simply by disconnecting the external storage device 400 from the information processing device 100 after finishing the work. This is contrastive to a conventional technique in which shutting down an information terminal triggers to execute the secret splitting processing and to delete secret data on a disk as the conventional technique cannot sufficiently eliminate the risks of information leakage caused by illegal intrusion on the information terminal or theft of the information terminal (remotely deleting data afterward might possibly be too late to prevent information leakage).

Figure 1B:
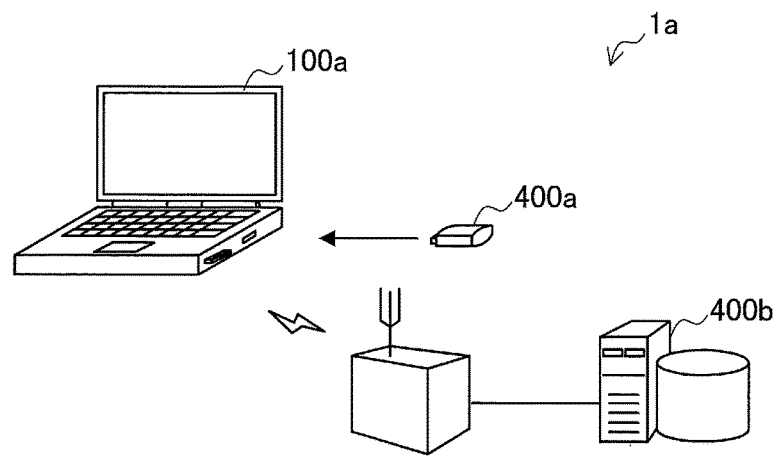
FIG. 1B illustrates a first application example of a system to which the technology according to the present disclosure can be applied.

FIG. 1B illustrates a first application example of a system to which the technology according to the present disclosure can be applied. While the secret information management system 1 in the example of FIG. 1A includes only a single external storage device 400, the secret information management system 1a in the first application example illustrated in FIG. 1B includes two external storage devices 400a and 400b in addition to an information processing device 100a. For example, the external storage device 400a is a USB memory that can be directly connected to the information processing device 100a. The external storage device 400b is a data server that can be connected to the information processing device 100a via a wireless communication interface. At least one of pieces of data split from secret data by the information processing device 100a using secret splitting can be written into the external storage device 400a. At least another one of the pieces of split data can be written into the external storage device 400b. A secondary storage device of the information processing device 100a may store one or more of the pieces of split data, or it is also possible for the secondary storage device of the information processing device 100a to store none of the pieces of split data.

Figure 1C:
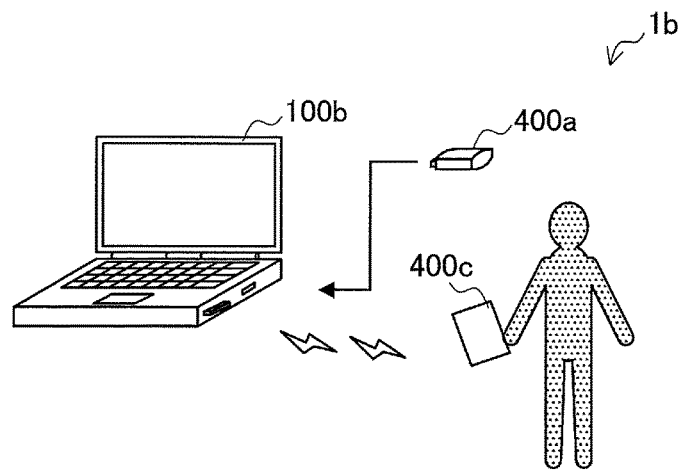
FIG. 1C illustrates a second application example of a system to which the technology according to the present disclosure can be applied.

FIG. 1C illustrates a second application example of a system to which the technology according to the present disclosure can be applied. The secret information management system 1b in the second application example illustrated in FIG. 1C includes two external storage devices 400a and 400c in addition to an information processing device 100b. The external storage device 400c is a terminal device that can be carried or worn by a user. At least one of pieces of data split from secret data by the information processing device 100b using secret splitting can be written into the external storage device 400a. At least another one of the pieces of split data can be written into the external storage device 400c. A secondary storage device of the information processing device 100b may store one or more of the pieces of split data, or it is also possible for the secondary storage device of the information processing device 100b to store none of the pieces of split data.

As understood from these application examples, secret data may be split into any number of pieces of split data using secret splitting in the technology according to the present disclosure. These pieces of split data are written at least into two storage devices that are physically different, and the storage devices may include any type of device that is connectable in any connection form. Computer programs executed at the information processing device, which will be described in detail later, do not necessarily have to be stored in advance in an internal medium (non-transitory computer-readable medium) of the information processing device. For example, such computer programs may be downloaded or called from an external server such as the external storage device 400b when executed.

It should be noted that the secret information management systems 1, 1a, and 1b will be herein generically referred to as secret information management system 1 with the alphabets at the ends of the reference signs omitted. Similarly, the information processing devices 100, 100a, and 100b will be generically referred to as information processing device 100, and the external storage devices 400, 400a, 400b, and 400c will be generically referred to as external storage device 400.

In many examples below, descriptions will be made assuming that secret data is split into two pieces of split data using secret splitting in the interest of brevity. These do not, however, limit the scope of the technology according to the present disclosure.

(2) Meaning of Terms

The following describes typical meanings of main terms used herein.

a) Secret Splitting (Also Referred to as Secret Sharing)

Secret splitting is the technology of transforming information desired to be kept secret in a certain scheme, and splitting the transformed information into a plurality of fragments (also referred to as shares). Appropriately selecting an information transform scheme eliminates the possibility of inferring the original information from the individual fragments. Recovering the original information requires to combine a predetermined number of fragments or more and storing these fragments into physically different devices will thus provide protection against security risks that, for example, one of the devices is lost or stolen. A transform before splitting information into a plurality of fragments, and an inverse transform after the plurality of fragments are combined are also referred to as encryption and decryption, respectively. One of the popular information transform schemes used for secret splitting is the All Or Nothing Transform (AONT) scheme proposed by R. Rivest in 1997. The AONT scheme has derivatives such as the AONT-cipher block chaining (CBC) scheme and the AONT-optimal asymmetric encryption padding (OAEP) scheme. For example, the AONT-CBC scheme is suitable for fast encryption per small block basis. The AONT scheme can be used in embodiments discussed below. The AONT scheme is well suitable for handling information in an information terminal in that the AONT scheme does not considerably change the amount of information before and after a transform. However, the technology according to the present disclosure is also applicable to other information transform schemes such as the threshold scheme.

b) Split Data

Split data is an individual fragment of data that has been formed by splitting secret data using secret splitting. As discussed above, secret data may be data in any format such as text, document, communication message, image, video, audio, setting data, or executable file.

c) Virtual Drive

A virtual drive is a virtualized storage area (drive) that is not present as a physical entity, but appears to a user or an application to be present. Secret data is maintained within a virtual drive in embodiments discussed below.

d) File Image

A file image is a representation of secret data within a virtual drive. The term "file image" is used, for example, to distinguish a file image from a normal file that can be stored on a secondary storage device. Once a file image is split using secret splitting, split files are formed. The technology according to the present disclosure can handle, as file images to which secret splitting is applied, not only general files handled by a user or an application, but also control files implicitly handled by the system (such as control files that defines hierarchical folder structure in a drive).

e) Virtual Drive Meta-Data

Virtual drive meta-data is meta-data that is used when a virtual drive is generated. As an example, virtual drive meta-data includes a drive name and drive size (capacity) of a virtual drive to be generated. The drive name of a virtual drive will be a part of a file path used when a user or an application accesses, for example, a file within the virtual drive. The drive name may be, for example, a drive letter in the Windows (registered trademark) OS. Virtual drive meta-data may further include other data such as creation date and time of the virtual drive, update date and time of the virtual drive, and the size of a used area on the virtual drive. Split meta-data is data that has been formed by splitting virtual drive meta-data using secret splitting.

f) File Meta-Data

File meta-data is meta-data indicating attributes of an individual file. As an example, file meta-data includes a file name, a file path, a creation date and time, an update date and time, and a file size. Split file meta-data is data that has been formed by splitting file meta-data using secret splitting. In some embodiments discussed below, even if a file image is not recovered, it is allowed to display an indication related to a file within the virtual drive on a screen, for example, via a file system by recovering file meta-data from split file meta-data.

g) Split Drive

A split drive is an actual drive (or a data area on an actual drive) into which split data that may include a split file, split meta-data, split file meta-data, and the like is written. The storage area of a split drive may consist at least of a meta-data area and a file data area. Split meta-data and split file meta-data are written into a meta-data area. A split file is written into a file data area. Each split drive is assigned a split drive identifier for uniquely identifying each split drive. For example, the split drive identifier may be obtained by concatenating a common character string shared between corresponding split drives (drives into which pieces of split data split from the same secret data are written) and a suffix number for differentiating each of these split drives. These identifiers can be used, for example, for verifying correspondence between the split drives.

2. Device Configurations (1) Hardware Configuration Example

Figure 2:
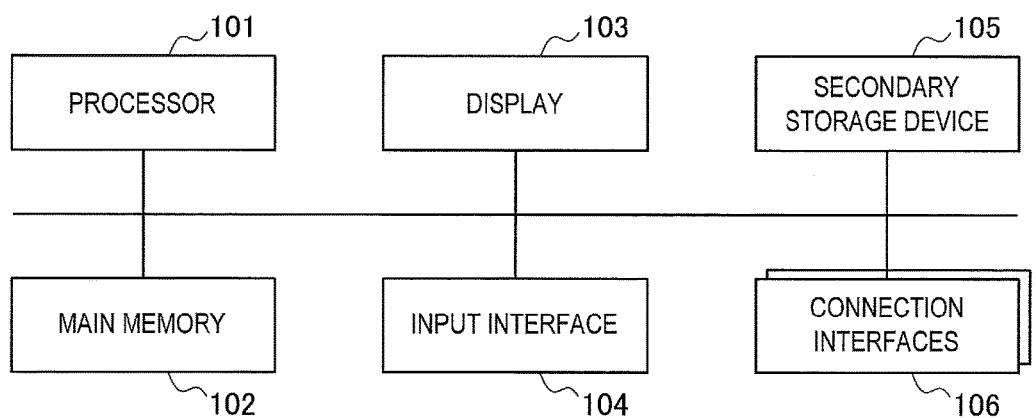
FIG. 2 illustrates an example of a hardware configuration of an information processing device according to an embodiment.

FIG. 2 illustrates an example of the hardware configuration of the information processing device 100 according to an embodiment. With reference to FIG. 2, the information processing device 100 includes a processor 101, a main memory 102, a display 103, an input interface 104, a secondary storage device 105, and one or more connection interfaces 106. The processor 101 may be, for example, a central processing unit (CPU) or a micro processing unit (MPU). The processor 101 controls the overall operation of the secret information management system 1 or the information processing device 100 by executing computer programs stored by, for example, the secondary storage device 105 or any other storage medium. The main memory 102 may be a volatile memory such as a RAM. The display 103 may be, for example, a liquid crystal display (LCD) or an organic light-emitting diode (OLED) display. The input interface 104 may include, for example, a touch panel, a keypad, a keyboard, a pointing device, or the like, and is configured to receive a user input. The secondary storage device 105 may be, for example, an HDD or an SSD. As an example, the secondary storage device 105 can be used as a split drive into which split data is written. The connection interface 106 may include, for example, a USB interface, an IC card interface, a memory card interface, a wired LAN interface, a wireless LAN interface, or a cellular communication interface, depending on the type of external storage device 400 to be connected thereto.

(2) Data Configuration Example

Figure 3:
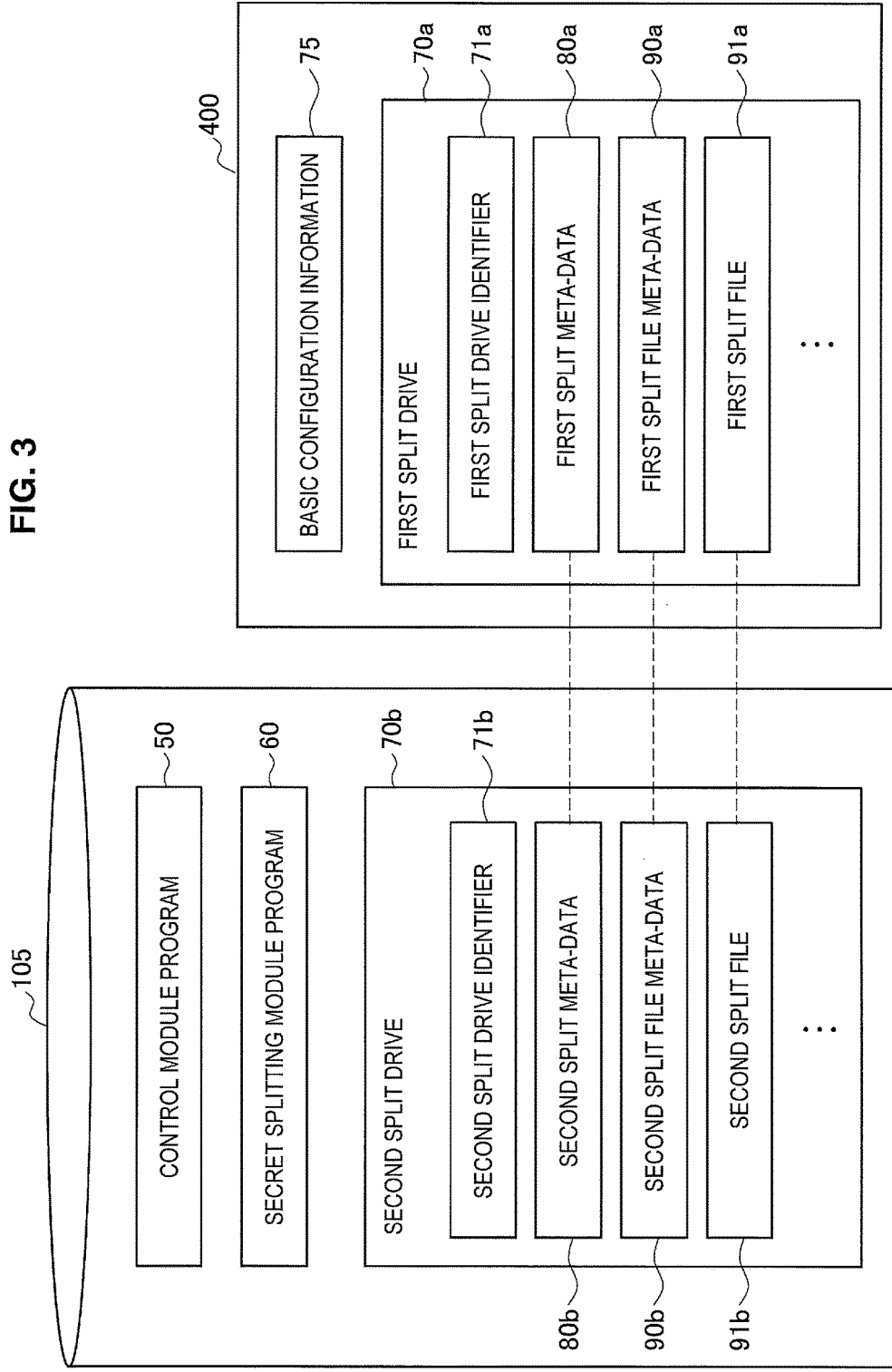
FIG. 3 illustrates an example of a configuration of data that can be stored by a secondary storage device and an external storage device.

FIG. 3 illustrates an example of the configuration of data that can be stored by the secondary storage device 105 and the external storage device 400.

With reference to FIG. 3, the secondary storage device 105 stores a control module program 50 and a secret splitting module program 60. The control module program 50 and the secret splitting module program 60 include sets of instructions for causing the processor 101 of the information processing device 100 to function as a control module 10 and a secret splitting module 30 (see FIG. 4), respectively. The control module 10 is a module that controls reading out and/or writing each piece of a plurality of pieces of split data formed by the secret splitting module 30 from and/or into a data area of a corresponding storage device. The secret splitting module 30 is a module for forming a plurality of pieces of split data by splitting secret data using secret splitting, and recovering the original data by combining at least two pieces of split data out of the plurality of pieces of split data under the control of the control module 10.

Basic configuration information 75 is stored in the predefined storage area of the external storage device 400. The basic configuration information 75 may include, for example, the number N of split drives, N split drive paths, and a version of a secret splitting (secret sharing) algorithm. When the number of split drives is fixed (e.g. secret data is always split into two pieces of split data), the number N of split drives may be omitted. For example, when N is equal to 2, a first split drive path indicates the path for the control module 10 to access a first split drive 70a, and a second split path indicates the path for the control module 10 to access a second split drive 70b.

The external storage device 400 further includes the first split drive 70a. The secondary storage device 105 further includes the second split drive 70b. The first split drive 70a of the external storage device 400 stores a first split drive identifier 71a, first split meta-data 80a, first split file meta-data 90a, and a first split file 91a. The second split drive 70b of the secondary storage device 105 stores a second split drive identifier 71b, second split meta-data 80b, second split file meta-data 90b, and a second split file 91b.

The first split drive identifier 71a uniquely identifies the first split drive 70a out of a plurality of split drives. The second split drive identifier 71b uniquely identifies the second split drive 70b out of a plurality of split drives. The first split meta-data 80a and the second split meta-data 80b are split data that has been formed by splitting, using secret splitting, virtual drive meta-data for generating a virtual drive.

When a file to be protected is created and requested to be saved within a virtual drive, the first split file meta-data 90a and the second split file meta-data 90b, and the first split file 91a and the second split file 91b may be stored within the respective split drives. The first split file meta-data 90a and the second split file meta-data 90b are split data that has been formed by splitting file meta-data of a file within a virtual drive using secret splitting. The first split file 91a and the second split file 91b are split data that has been formed by splitting a file image of a file within a virtual drive using secret splitting. Though FIG. 3 illustrates only a single set of split file meta-data and a split file, several sets of split file meta-data and split files corresponding to the files within a virtual drive may actually be stored.

(3) Functional Configuration Example

Figure 4:
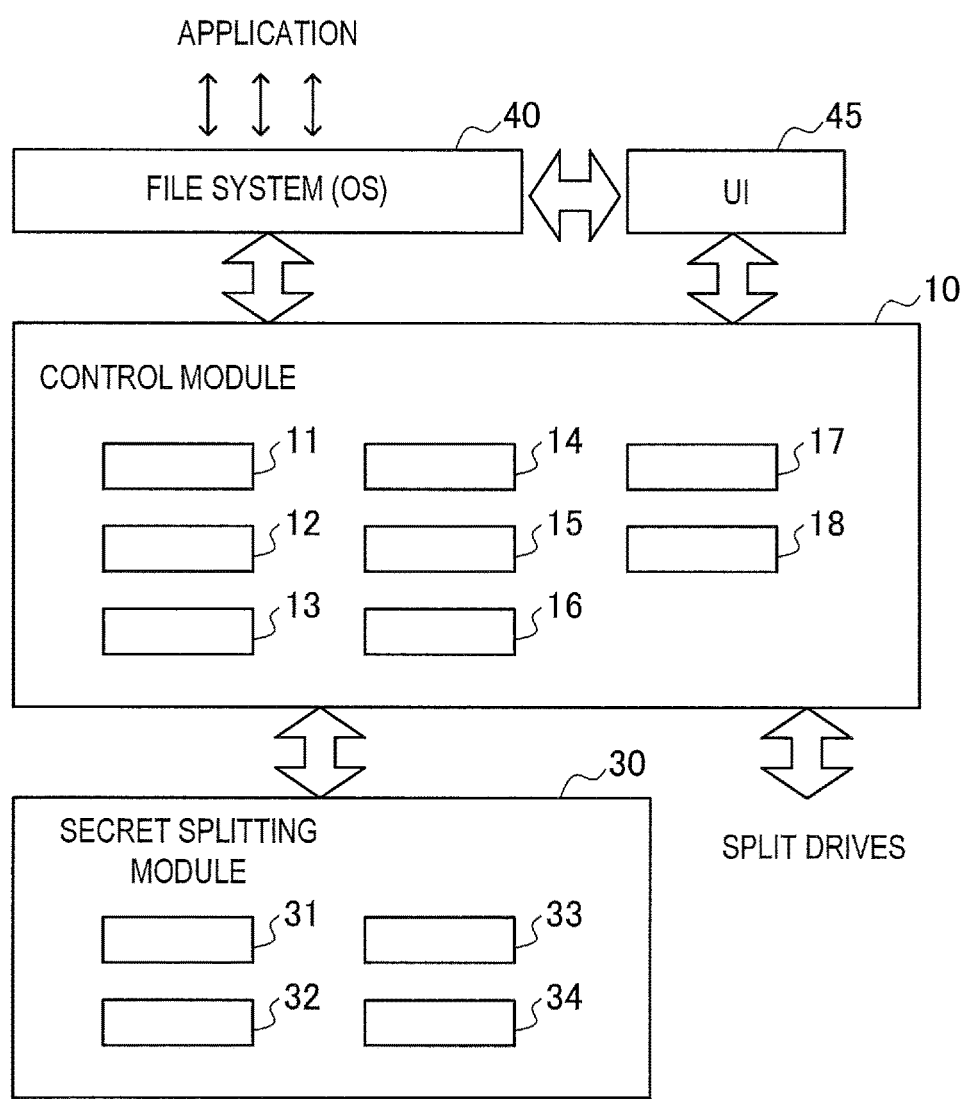
FIG. 4 illustrates an example of a logical functional configuration of an information processing device according to an embodiment.

FIG. 4 illustrates an example of the logical functional configuration of the information processing device 100 according to an embodiment. It should be noted that functions that are not directly related to the technology according to the present disclosure are not shown in FIG. 4. With reference to FIG. 4, the information processing device 100 includes the above-described control module 10 and secret splitting module 30 as well as a file system 40 and a user interface (UI) module 45.

The control module 10 has a drive setting function 11, a virtual drive meta-data splitting function 12, a split drive cooperation function 13, an event monitoring function 14, a virtual drive meta-data recovery function 15, a virtual drive management function 16, a file splitting function 17, and a file recovery function 18.

The drive setting function 11 is a function for acquiring setting data of a virtual drive to be generated, and creating virtual drive meta-data. The drive setting function 11 may cause the UI module 45 to display, for example, an interactive GUI on the screen of the display 103, and acquire setting data input by a user or a system administrator using the input interface 104. Alternatively, the drive setting function 11 may acquire setting data by receiving a setting data file created by another device in advance from an external data server. Similarly, the drive setting function 11 may also acquire setting data for the basic configuration information 75, and the split drive identifiers 71a and 71b.

The virtual drive meta-data splitting function 12 causes the secret splitting module 30 to split virtual drive meta-data created by the drive setting function 11 at least into the first split meta-data 80a and the second split meta-data 80b in accordance with the split settings (such as the number N of split drives, and the split size of each drive).

The split drive cooperation function 13 writes, when the first split drive 70a is not present in the external storage device 400, the basic configuration information 75 into the predefined storage area of the external storage device 400, creates the data area of the first split drive 70a, and writes the first split drive identifier 71a into the first split drive 70a. The split drive cooperation function 13 then writes the first split meta-data 80a split from the virtual drive meta-data into the first split drive 70a. When the second split drive 70b is not present in the secondary storage device 105, the split drive cooperation function 13 creates the data area of the second split drive 70b in the secondary storage device 105, and writes the second split drive identifier 71b into the second split drive 70b. The split drive cooperation function 13 then writes the second split meta-data 80b split from the virtual drive meta-data into the second split drive 70b.

The event monitoring function 14 monitors and detects events that occur in the file system 40, the UI module 45, and the connection interfaces 106. The events detected by the event monitoring function 14 may include, for example, the followings:

file saving request;
unmount request of a virtual drive;
connection of the external storage device 400 to the information processing device 100;
disconnection of the external storage device 400 from the information processing device 100;
activation (i.e. open) of a virtual drive;
activation of a folder within a virtual drive; and
activation of a file within a virtual drive.

For example, when a user instructs a document editing application to save an edited document file, the event monitoring function 14 may detect a file saving request from the document editing application via the file system 40.

After split meta-data is written into the corresponding storage device, and the external storage device 400 is disconnected from the information processing device 100, the virtual drive meta-data recovery function 15 reads out, in response to detection of an event, the first split meta-data 80*a* from the first split drive 70*a* through the split drive cooperation function 13. The virtual drive meta-data recovery function 15 also reads out the corresponding second split meta-data 80*b* from the second split drive 70*b* through the split drive cooperation function 13. The virtual drive meta-data recovery function 15 then causes the secret splitting module 30 to recover the virtual drive meta-data at least from the first split meta-data 80*a* and the second split meta-data 80*b*. An event that triggers the recovery of the virtual drive meta-data includes, for example, connection of the external storage device 400, which stores the first split meta-data 80*a*, to the information processing device 100. Alternatively, the virtual drive meta-data may be recovered after a successful authentication of a user who is authorized to access the virtual drive.

The virtual drive meta-data recovery function 15 may also verify the correspondence between split drives or pieces of split meta-data before starting the recovery of virtual drive meta-data. For example, the virtual drive meta-data recovery function 15 can verify the above-described correspondence by determining whether or not the split drive identifiers of the respective split drives include a certain character string, and/or whether or not time stamps such as creation dates and time or update dates and time match with each other. When it is determined that the correspondence is incorrect, the virtual drive meta-data recover function 15 may cancel the recovery of the virtual drive meta-data.

The virtual drive management function 16 generates a virtual drive based on the virtual drive meta-data recovered by the virtual drive meta-data recovery function 15. The virtual drive management function 16 may generate a virtual drive, for example, by registering settings of the virtual drive onto the file system 40. As an example, the virtual drive management function 16 maintains secret data within the virtual drive as a file image stored only in a volatile memory (typically, the main memory 102). The secret data within the virtual drive herein may be any type of data handled by a user within the virtual drive. The virtual drive management function 16 disables the virtual drive when a request for unmounting the virtual drive is detected. When the disconnection of the external storage device 400 from the information processing device 100 is detected, the virtual drive management function 16 also disables the virtual drive. The virtual drive management function 16 may disable a virtual drive, for example, by erasing the settings of the virtual drive registered onto the file system 40. Once the virtual drive is disabled in this way, a user or a third person cannot access data within the virtual drive.

The file splitting function 17 causes, when saving a file within a virtual drive is requested, the secret splitting module 30 to split the file image of the file to be saved at least into the first split file 91*a*, and the second split file 91*b* using secret splitting. The first split file 91*a* is written into the first split drive 70*a* by the split drive cooperation function 13. The second split file 91*b* is written into the second split drive 70*b* by the split drive cooperation function 13. In addition, the file splitting function 17 causes the secret splitting module 30 to split the file meta-data of the file to be saved at least into the first split file meta-data 90*a* and the second split file meta-data 90*b*. The first split file meta-data 90*a* is written into the first split drive 70*a* by the split drive cooperation function 13. The second split file meta-data 90*b* is written into the second split drive 70*b* by the split drive cooperation function 13. Such file meta-data can be used for causing the UI module 45 to display an indication related to the file within the virtual drive on the screen.

The split drive cooperation function 13 may write the first split file 91*a* and the second split file 91*b* respectively into the first split drive 70*a* and the second split drive 70*b* in response to the detection of a file saving request in a first operation mode. The first operation mode can be referred to, for example, as direct mode because a split file is directly written into a split drive at the time of file saving.

Meanwhile, in a second operation mode, the split drive cooperation function 13 may further wait for the detection of a request for unmounting a virtual drive after the file splitting function 17 splits a file image into the first split file 91*a* and the second split file 91*b* in response to the detection of a file saving request, and then write the first split file 91*a* into the first split drive 70*a*. In the second operation mode, the split files may be maintained in a volatile memory by the virtual drive management function 16 during the interval from the detection of the file saving request to the detection of the unmount request. The second operation mode can be referred to, for example, as cache mode because at least one split file is not written into a split drive at the time of file saving but is cached in a memory. The operation mode of the system may be fixedly preconfigured depending on the needs of a user, or may be dynamically switchable between two or more modes.

The virtual drive management function 16 may cause, when one or more files are present within a virtual drive, the UI module 45 to display indications related to those files on the screen automatically after the virtual drive is generated or after the virtual drive is opened via the file system 40. The file meta-data needed to generate an indication related to a file is recovered from the first split file meta-data 90*a* and the second split file meta-data 90*b*. The split drive cooperation function 13 reads out the first split file meta-data 90*a* and the second split file meta-data 90*b* respectively from the first split drive 70*a* and the second split drive 70*b*. The file recovery function 18 causes the secret splitting module 30 to recover the file meta-data at least from the first split file meta-data 90*a* and the second split file meta-data 90*b* thereby enabling an indication related to the file within the virtual drive to be displayed. An indication related to a file corresponds, for example, to each item in a list of files within a drive, and can include a file name, a file size, an icon, an update date, and the like.

Furthermore, when a user input is made toward an indication related to the displayed file (e.g. the file name or the icon is double-clicked or tapped) to request activation of the file within the virtual drive, the file recovery function 18 reads out at least the first split file 91*a* and the second split file 91*b* out of a plurality of split files split from the file image of the file respectively from the first split drive 70*a* and the second split drive 70*b* through the split drive cooperation function 13. The file recovery function 18 then causes the secret splitting module 30 to recover the file image of the file to be activated at least from the first split file 91*a* to the second split file 91*b*. Alternatively, the file recovery function 18 may recover a file image of a specific file within a virtual drive without waiting for a request for activating the file.

The control module 10 may ask a user to input a password at any timing of the various operations as described above. For example, when the connection of the external storage device 400 is detected, the control module 10 may ask a user to input a password before reading out split meta-data from the corresponding split drive, and may read out the split meta-data only if the password is successfully authenticated.

The secret splitting module 30 includes an encryption function 31, a splitting function 32, a combination function 33, and a decryption function 34. The encryption function 31 encrypts designated data (such as virtual drive meta-data, file meta-data, or a file image), for example, by the AONT scheme under the control of the control module 10. The splitting function 32 splits the data encrypted (AONT-transformed) by the encryption function 31 into a designated number of pieces of split data each of which has a designated size. The combination function 33 combines at least two pieces of split data out of the plurality of pieces of split data that have been formed using secret splitting from data to be recovered, and generates combined data. The decryption function 34 recovers the secret data by decrypting the combined data based on the at least two pieces of split data by the AONT scheme to obtain the original data.

As an example, the secret splitting module 30 performs these operations of encryption, splitting, combination, and description per block basis. The block size desirably matches with the size of the allocation unit of the file system 40 (e.g. 4096 bytes in NTFS). When the processing unit of the secret splitting processing has a large size, processing time increases exponentially rather than linearly to the data size of data to be split. Meanwhile, if the secret splitting processing is executed in as small processing units as the allocation size of the file system, increase in the processing time due to increase in data size can be suppressed to substantially linear increase.

The file system 40 is a system module of the operating system operating on the information processing device 100 for managing files. Any type of file system such as NTFS, FAT, or FAT32 may be used. The configuration that the file system 40 intervenes between various applications on the information processing device 100, and the control module 10 and the secret splitting module 30 eliminates the necessity for these applications to recognize the presence of the control module 10 and the secret splitting module 30. The above-described operation of secret splitting according to the size of the allocation unit of the file system 40 and the above-described configuration that the file system 40 intervenes allow the secret information management system 1 to smoothly operate on many platforms, on which various applications and operating systems may be executed, without requiring any individual functional modifications.

The file system 40 or the operating system operating on the information processing device 100 receives registration of settings of a virtual drive from the control module 10. Once a virtual drive is registered, the virtual drive is handled similarly to another physical or logical disk drive from the perspective of a user or an application. In other words, a user can conduct various kinds of work such as updating a file, moving a file, copying a file, changing a file name, creating a folder (directory), and setting an attribute of a folder within a virtual drive without paying attention to differences from an actual drive.

The UI module 45 provides a user interface for the control module 10 and the file system 40 to interact with a user. For example, the UI module 45 displays a GUI on the screen of the display 103, and receives a user input via the input interface 104. The UI module 45 may also provide a nonvisual user interface such as a speech UI or a gesture UI.

3. Flows of Processes

Next, flows of operations in the secret information management system 1 will be described in detail.

(1) Virtual Drive Generation

Figure 5:
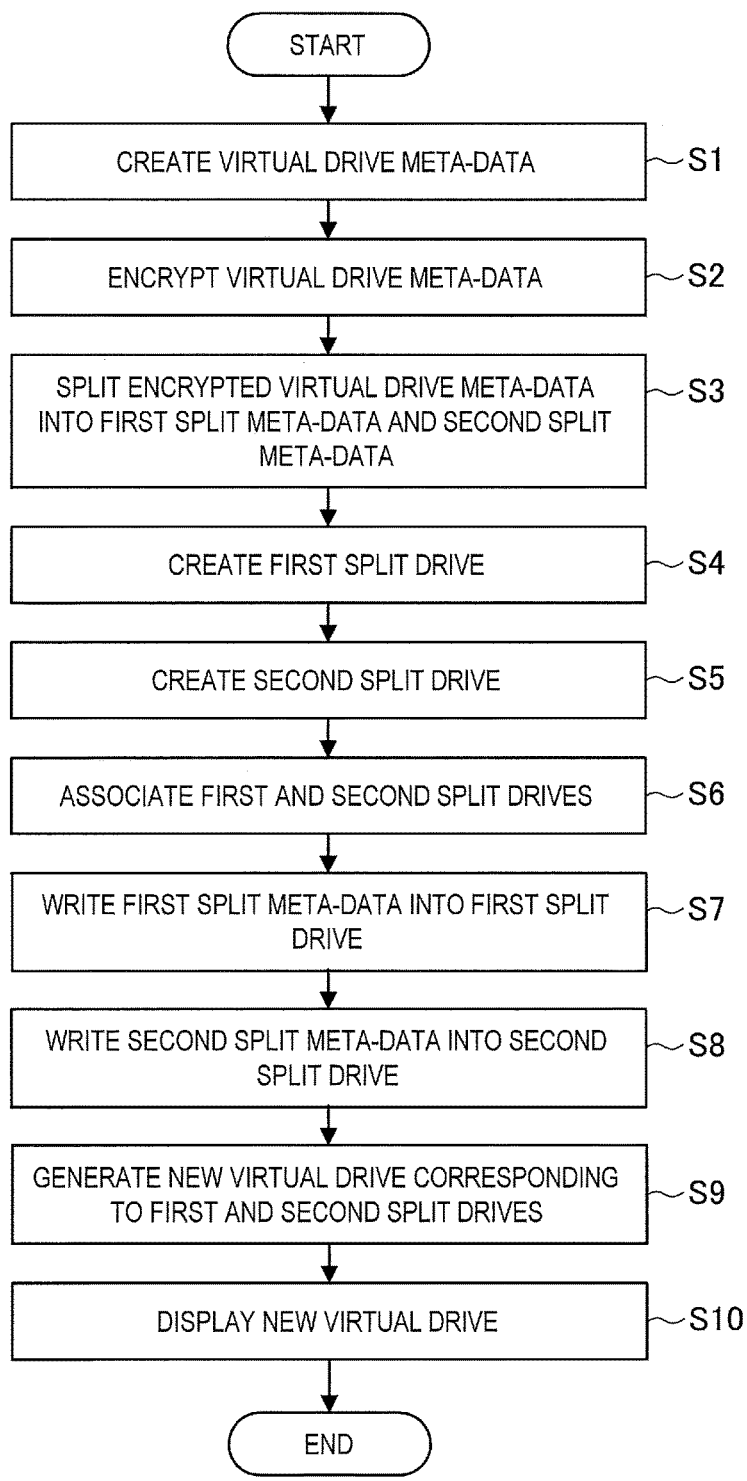
FIG. 5 is a flowchart illustrating an example of a flow of virtual drive generation processing for newly generating a virtual drive.

FIG. 5 is a flowchart illustrating an example of a flow of virtual drive generation processing for newly generating a virtual drive.

First of all, in step S1, the control module 10 acquires the setting data of a virtual drive to be generated, and creates virtual drive meta-data. The virtual drive meta-data created here can include, for example, a drive name and capacity of the new virtual drive.

Next, in step S2, the control module 10 causes the secret splitting module 30 to encrypt the created virtual drive meta-data. In step S3, the control module 10 causes the secret splitting module 30 to split the encrypted virtual drive meta-data into the first split meta-data 80a and the second split meta-data 80b.

In step S4, the control module 10 creates the first split drive 70a in the external storage device 400. In step S5, the control module 10 creates the second split drive 70b in the second storage device 105. Note that neither data nor files have been written into the first or second split drive 70a or 70b until this step. Needless to say, step S4 is performed with the external storage device 400 connected to the information processing device 100 via the connection interface 106.

Next, in step S6, in order to associate the created first and second split drives 70a and 70b with each other, the control module 10 writes the first split drive identifier 71a and the second split drive identifier 71b respectively into the first split drive 70a and the second split drive 70b. In addition, the control module 10 writes the basic configuration information 75 into the predefined storage area of the external storage device 400. The basic configuration information 75 includes, for example, the split drive path of the first split drive 70a within the external storage device 400, and the split drive path of the second split drive 70b within the secondary storage device 105. This allows the control module 10 to access each split drive later, and verify the correspondence between the split drives by collating the split drive identifiers and collating other meta-data.

Next, in step S7, the control module 10 writes the first split meta-data 80a into the first split drive 70a. Next, in step S8, the control module 10 writes the second split meta-data 80b into the second split drive 70b.

Next, in step S9, the control module 10 generates a new virtual drive corresponding to the first and second split drives 70a and 70b. More specifically, the control module 10 may generate the virtual drive, for example, by registering the setting data included in the virtual drive meta-data onto the file system 40. The control module 10 may use the virtual drive meta-data created or acquired in step S1. Alternatively, the control module 10 may cause the secret splitting module 30 to recover the virtual drive meta-data from the first split meta-data 80a and the second split meta-data 80b respectively written into the first split drive 70a and the second split drive 70b.

Finally, in step S10, the newly generated virtual drive is displayed on the screen of the display 103. It should be noted that the control module 10 may display a message notifying a user that the virtual drive is generated, instead of displaying the virtual drive itself (e.g. icon of the virtual drive), on the screen of the display 103.

The virtual drive generation processing illustrated in FIG. 5 then finishes.

(2) File Splitting

Figure 6:
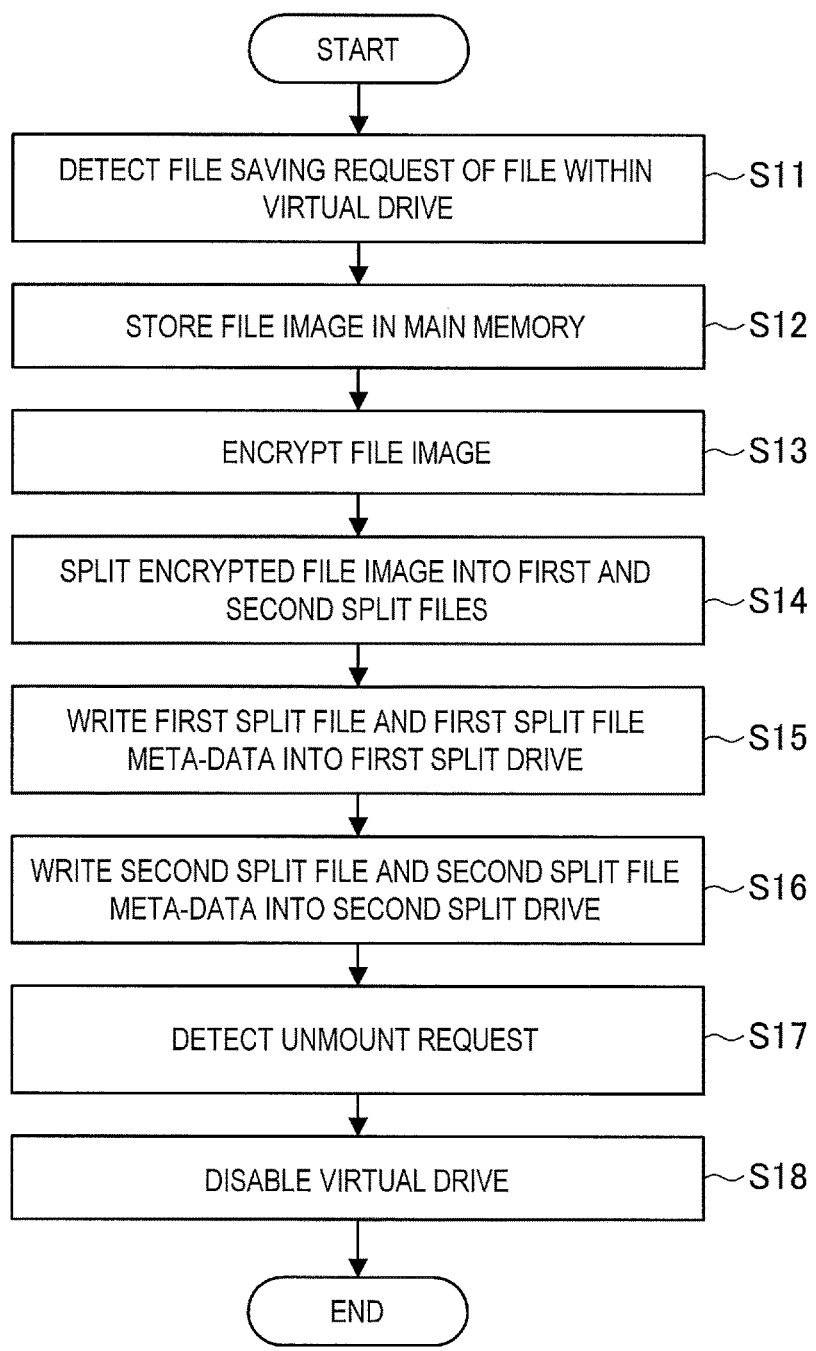
FIG. 6 is a flowchart illustrating an example of a flow of file splitting processing for splitting a file using secret splitting.

FIG. 6 is a flowchart illustrating an example of a flow of file splitting processing for splitting a file using secret splitting.

In step S11, the control module 10 detects a file saving request of a file within a virtual drive. As an example, saving a file within a virtual drive may be triggered by moving a file stored by a drive (such as an actual drive) other than the virtual drive into the virtual drive. As another example, saving a file within a virtual drive may be triggered by overwriting, after a file already present within the virtual drive is updated, the file within the virtual drive. The file saving request can be detected, for example, from an application (such as a document editing application for a document file) associated with the file to be saved or an operating system via the file system 40.

Once the above-mentioned file saving request is detected, the control module 10 stores, in step S12, the file image of the file to be saved in the storage area for the virtual drive within the main memory 102. The file image is written into corresponding memory addresses of the main memory 102, for example, per block basis. The block size may be, for example, 4096 bytes per a block.

Next, in step S13, the control module 10 causes the secret splitting module 30 to encrypt the file image of the file to be saved within the virtual drive. The file image is encrypted per block basis, for example, for each block of the file image stored in the main memory 102.

Next, in step S14, the control module 10 causes the secret splitting module 30 to split the encrypted file image into the first and second split files 91a and 91b. The encrypted file image may also be split per block basis. For example, when the file image has three blocks, each of those three blocks may be split, for example, into the first split file 91a having 4 bytes, and the second split file 91b having 4092 bytes.

In addition, the control module 10 causes the secret splitting module 30 to encrypt the file meta-data of the file to be saved, and to split the file meta-data into the first split file meta-data 90a and the second split file meta-data 90b. Note that the file meta-data may also be encrypted and split per block basis.

Next, in step S15, the control module 10 writes the first split file 91a and the first split file meta-data 90a into the first split drive 70a. Next, in step S16, the control module 10 writes the second split file 91b and the second split file meta-data 90b into the second split drive 70b. The first split file 91a is written into the file data area of the first split drive 70a, and the second split file 91b is written into the file data area of the second split drive 70b. The first split file meta-data 90a is written into the file meta-data area of the first split drive 70a, and the second split file meta-data 90b is written into the file meta-data area of the second split drive 70b. Needless to say, step S15 is performed with the external storage device 400 connected to the information processing device 100 via the connection interface 106.

Afterwards, once a request for unmounting the virtual drive is detected in step S17, the control module 10 disables the virtual drive in step S18. For example, this causes the displayed virtual drive to disappear from the screen. Furthermore, the external storage device 400 may be disconnected from the information processing device 100. Even when the request for unmounting the virtual drive is not input or detected, but the external storage device 400 is suddenly disconnected (e.g. when a USB memory is pulled out), the control module 10 may disable the virtual drive and cause the displayed virtual drive to disappear from the screen in response to detecting the disconnection.

The file splitting processing illustrated in FIG. 6 then finishes.

(3) Virtual Drive Recovery

Figure 7:
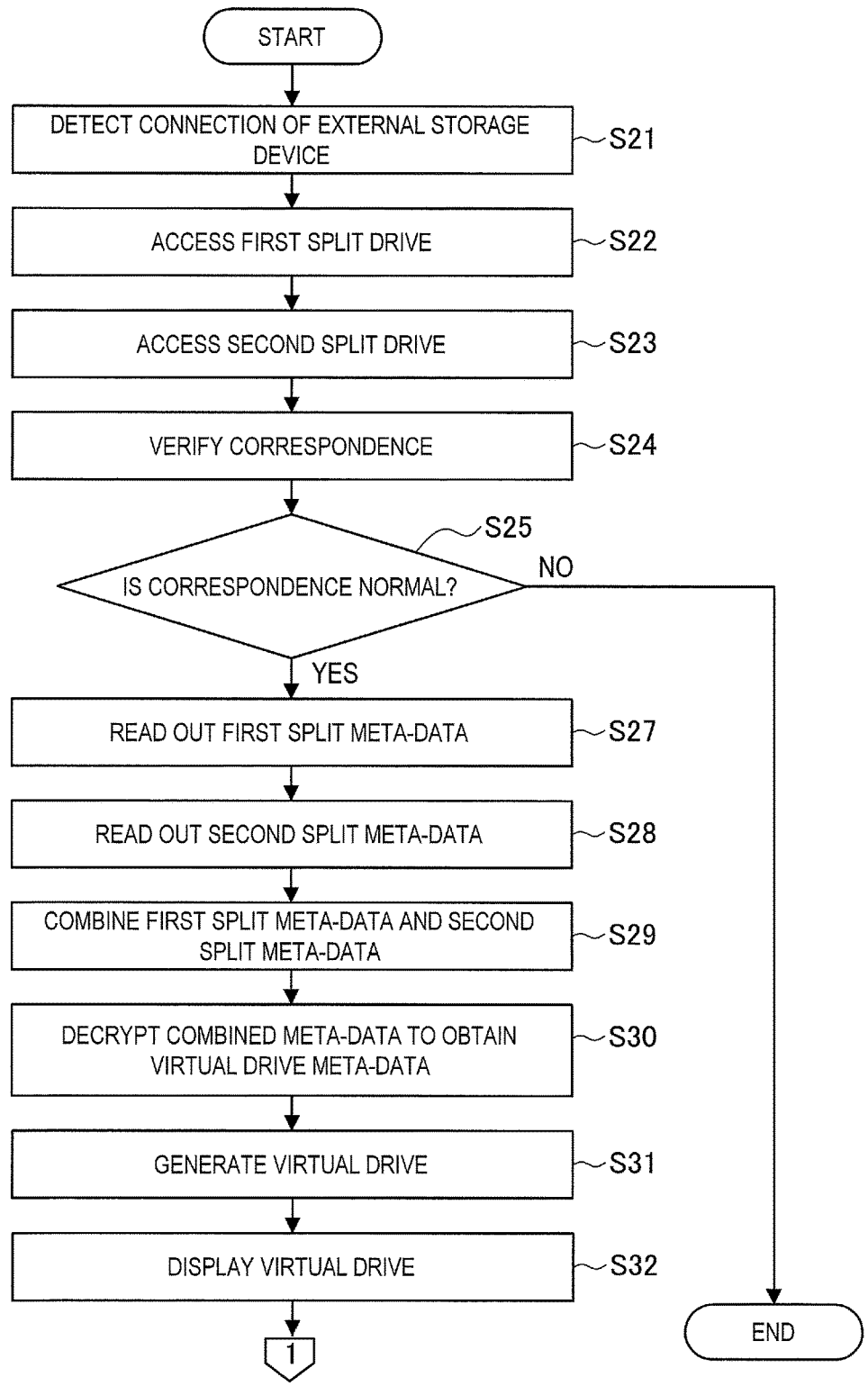
FIG. 7 is a flowchart illustrating an example of a flow of virtual drive recovery processing for recovering a virtual drive.
Figure 8:
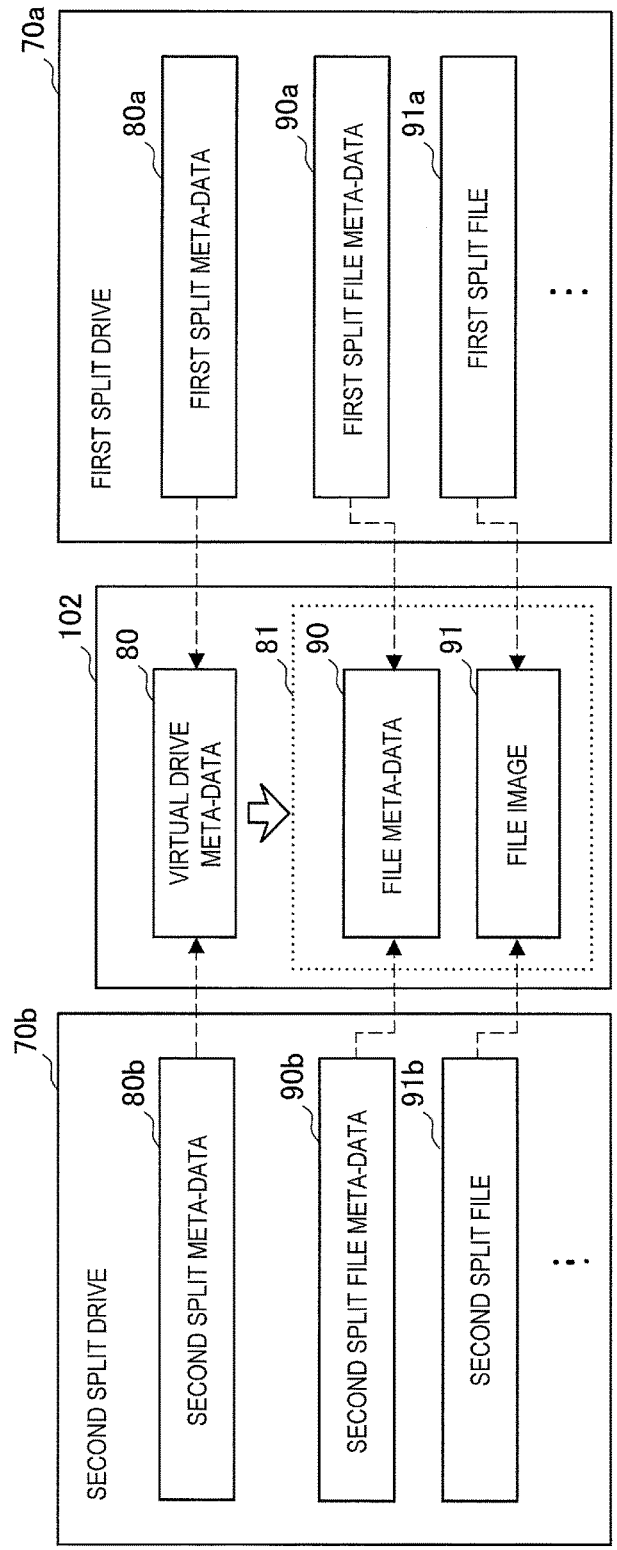
FIG. 8 illustrates an example of a schematic data configuration of a recovered virtual drive.

FIG. 7 is a flowchart illustrating an example of a flow of virtual drive recovery processing for recovering a virtual drive. FIG. 8 illustrates an example of the schematic data configuration of a recovered virtual drive.

First of all, in step S21, the control module 10 detects connection of the external storage device 400 to the information processing device 100 via the connection interface 106. In step S22, in response to detecting the connection, the control module 10 reads out the basic configuration information 75 stored by the external storage device 400, and accesses the first split drive 70a of the external storage device 400. In step S23, the control module 10 accesses the second split drive 70b of the secondary storage device 105. The control module 10 may read out data sets within these split drives and load the data sets onto the main memory 102 at this time. The data set of the first split drive 70a includes the first split drive identifier 71a, and the data set of the second split drive 70b includes the second split drive identifier 71b.

Next, in step S24, the control module 10 verifies the correspondence between the first and second split drives 70a and 70b. For example, the control module 10 may determine whether or not the first split drive identifier 71a and the second split drive identifier 71b include a certain common character string, and exactly have expected suffix numbers. The control module 10 may also determine whether or not time stamps such as creation dates and time, or update dates and time match with each other.

If it is determined in step S25 that the correspondence between the two split drives is normal, the virtual drive recovery processing proceeds to step S27. If it is determined that the correspondence between the two split drives is not normal, the virtual drive recovery processing may be canceled. When the virtual drive recovery processing is canceled, the control module 10 may output, via the UI module 45, an error message notifying a user that the generation of a virtual drive results in failure. Instead, it is also possible for the control module 10 to output no message in order to conceal the presence of secret data from a malicious third person.

In step S27, the control module 10 reads out the first split meta-data 80a from the first split drive 70a (or from the main memory 102 when the first split meta-data 80a has already been loaded onto the main memory 102). In step S28, the control module 10 reads out the second split meta-data 80b from the second split drive 70b (or from the main memory 102 when the second split meta-data 80b has already been loaded onto the main memory 102).

Next, in step S29, the control module 10 causes the secret splitting module 30 to combine the read-out first split meta-data 80a and the read-out second split meta-data 80b. In step S30, the control module 10 causes the secret splitting module 30 to decrypt the combined meta-data of the first split meta-data 80a and the second split meta-data 80b to obtain the virtual drive meta-data.

Next, in step S31, the control module 10 generates a virtual drive 81 based on virtual drive meta-data 80 recovered through the decryption using secret splitting (see FIG. 8).

Finally, in step S32, the virtual drive 81 recovered in this way is displayed on the screen of the display 103. It should be noted that the virtual drive (e.g. icon of the virtual drive)

is not necessarily displayed and a message notifying a user that the virtual drive is recovered may be displayed on the screen instead.

After the virtual drive is recovered, the control module 10 may further recover file meta-data 90 from the first split file meta-data 90a and the second split file meta-data 90b. Alternatively, the control module 10 may recover the file meta-data 90 from the first split file meta-data 90a and the second split file meta-data 90b when activation of the virtual drive is detected via the file system 40. The activation of the virtual drive can be requested, for example, through a user input (such as a double-click or a tap) toward the icon of the virtual drive displayed on the screen. For example, the control module 10 reads out the first split file meta-data 90a and the second split file meta-data 90b respectively from the first split drive 70a (or the main memory 102) and the second split drive 70b (or the main memory 102). The control module 10 then causes the secret splitting module 30 to recover the file meta-data 90 from the read-out split file meta-data 90a and the read-out split file meta-data 90b.

FIG. 8 illustrates the single piece of file meta-data 90 alone as an example. However, when a plurality of files are present in the virtual drive, the control module 10 may cause the secret splitting module 30 to recover the file meta-data 90 of each of the files. For example, only the file meta-data of files in a topmost folder in the hierarchical folder structure of the virtual drive may be recovered (the file meta-data of another file can be recovered after the corresponding folder is opened). Alternatively, only some pieces of file meta-data of a limited number of files dependent on the capacity of the virtual drive may be recovered. The recovered file meta-data 90 is handed over to the file system 40. Once the virtual drive is activated, the file system 40 generates an indication (such as an item or an icon in a list of files) related to each file within the virtual drive, and displays the generated indication on the screen.

The virtual drive recovery processing illustrated in FIG. 7 then finishes.

(4) File Recovery

Figure 9:
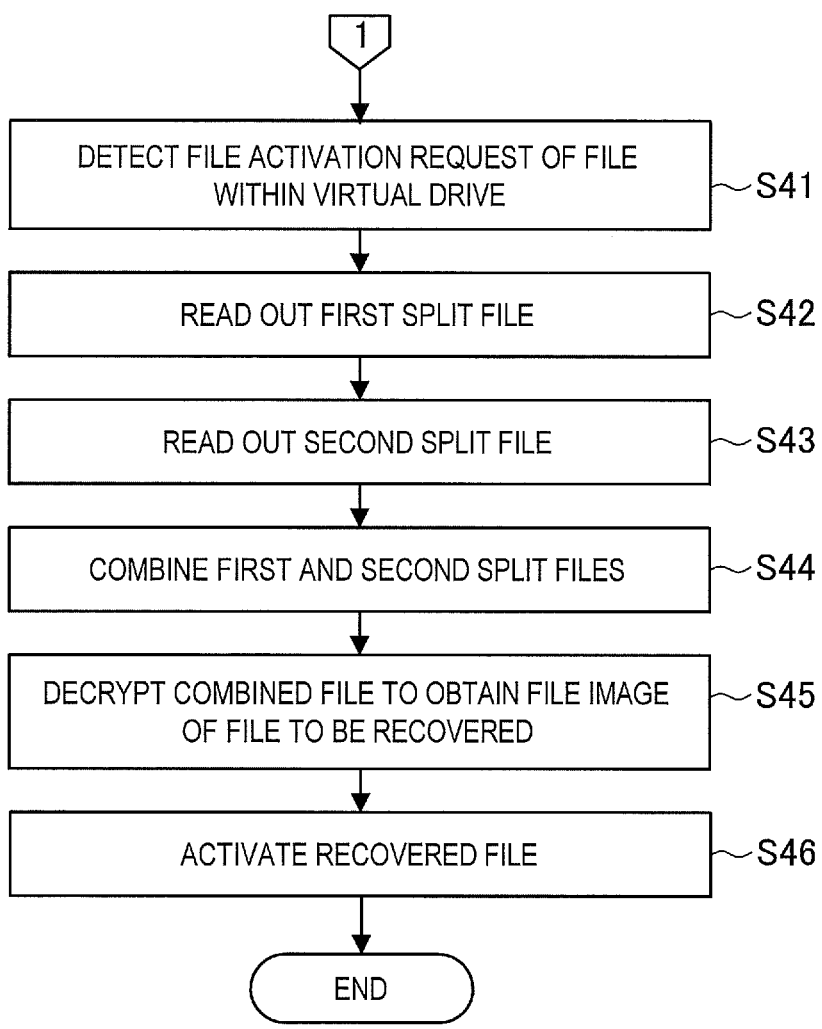
FIG. 9 is a flowchart illustrating an example of a flow of file recovery processing for recovering a file using secret splitting.

FIG. 9 is a flowchart illustrating an example of a flow of file recovery processing for recovering a file using secret splitting.

First of all, in step S41, the control module 10 detects a file activation request of a file within a virtual drive during the state in which the virtual drive is active. The activation of the file can be requested, for example, through a user input toward an indication related to the file displayed based on the file meta-data 90.

In step S42, the control module 10 reads out the first split file 91a corresponding to the file to be activated from the first split drive 70a in response to detecting the file activation request. In step S43, the control module 10 reads out the second split file 91b corresponding to the file from the second split drive 70b.

Next, in step S44, the control module 10 causes the secret splitting module 30 to combine the read-out first and second split files 91a and 91b. In step S45, the control module 10 causes the secret splitting module 30 to decrypt the combined file of the first and second split files 91a and 91b to obtain the file image of the file to be recovered.

Next, in step S46, the control module 10 hands over the file image recovered as a result of the decryption to the file system 40, and causes the file as desired by the user to be activated, for example, through an application associated with the file.

The file recovery processing illustrated in FIG. 9 then finishes.

4. Conclusion

According to the above-described embodiment, there is provided a computer program which, when executed by a processor of an information processing device, causes the processor to function as a secret splitting module and a control module. The information processing device includes a connection interface configured to be connected to a first storage device that is an external storage device, the processor, and a volatile memory. The secret splitting module is configured to recover secret data by combining at least two pieces of split data out of a plurality of pieces of split data. The control module is configured to control reading out and/or writing each piece of the plurality pieces of split data from and/or into the data area of the corresponding storage device. The secret data is maintained within a virtual drive, and the virtual drive meta-data for generating the virtual drive is split at least into two pieces of split meta-data. The control module reads out the first split meta-data and second split meta-data respectively from the first storage device and a second storage device, causes the secret splitting module to recover the virtual drive meta-data at least from the first split meta-data and the second split meta-data, and generates the virtual drive based on the recovered virtual drive meta-data.

According to such a configuration, it is possible to protect, by secret splitting, a virtual drive that provides space for a user to handle secret data. The secret data within the virtual drive is also protected by secret splitting, and the above-described configuration thus provides a mechanism of protecting the secret data from the risks of leakage with double barriers. If a user creates data in a virtual drive, the data is protected from the beginning of the creation.

In some examples, the secret data within the virtual drive may be maintained as a file image stored only in a volatile memory. This prevents the secret data from leaking, for example, from the disk of the secondary storage device even if the information processing device is hacked after the secret data is recovered.

In some examples, the first split meta-data may be read out from the first storage device in response to detection of connection of the first storage device to the information processing device. This ties the life cycle of the virtual drive from generation to disappearance with actions of connecting and disconnecting the external storage device, which can be intuitively grasped by a user. Data or files within the virtual drive can be accessed by a user only while the virtual drive is present on the information processing device. A user can thus manage data appropriately and secretly only by paying attention to the connection state of the external storage device. As long as works such as creating, viewing, and updating data are conducted within the virtual drive, such works can be conducted in the same way as works usually done on a typical information processing device for normal data (data which does not need to be protected).

In some examples, when a request for unmounting the virtual drive is detected, or disconnection of the first storage device is detected, the virtual drive may be disabled. In other words, a user can deny access to the virtual drive and ensure that the secret data is protected, for example, using an explicit unmount request at the time of finishing or stopping work. A user can also deny access to the virtual drive and ensure that the secret data is protected through an intuitive action of disconnecting the external storage device. Disabling the virtual drive may include erasing data within the virtual drive which is maintained on the memory. Alternatively, data within the virtual drive may be erased at some time point later than when the virtual drive is disabled.

In some examples, the virtual drive may be generated by registering settings of the virtual drive onto the file system of the information processing device. The virtual drive may be disabled by erasing the settings of the virtual drive from the file system. In this way, realizing the virtual drive using functionality of existing file system and allowing the file system to intervene between applications and the secret splitting technology make it possible to provide a smooth operation of a system without making any impact on a variety of existing applications and future applications to be developed.

In some examples, when activation of a file within the virtual drive is requested, the control module may read out at least two split files out of a plurality of split files, which have been formed by splitting a file image of the file using secret splitting, from the corresponding storage devices, and cause the secret splitting module to recover the file image of the file to be activated from the at least two split files. This means that a file image of a file within the virtual drive is not recovered until the activation of the file is requested, and a file image of a file that is not activated is not recovered. According to such a configuration, waiting time for processing is reduced because there is no need to recover a large-sized data set at one time. Since the virtual drive will maintain only file images of the fewest needed files, the security level is enhanced as compared with a technology of collectively encrypting (splitting)/decrypting (combining) all the data within a drive.

In some examples, file meta-data of a file within the virtual drive may be split into a plurality of pieces of split file meta-data, and the control module may read out at least two pieces of split file meta-data from the corresponding storage devices, and cause the secret splitting module to recover the file meta-data at least from those two pieces of split file meta-data thereby enabling an indication related to the file within the virtual drive to be displayed. According to such a configuration, it is possible to protect secret data with triple barriers of three layers including a virtual drive, file meta-data needed to access a file within the virtual drive, and a file. For example, a configuration may be adopted where the activation of the file within the virtual drive is requested through a user input toward the indication related to the file displayed based on the file meta-data to be recovered. In this case, a chain of secret splitting processes is constructed in which the file meta-data of a predetermined file has to be recovered to recover the file, and the virtual drive meta-data has to be recovered to access the file meta-data. Accordingly, the security level can be further enhanced. The meta-data and files may be read out (loaded onto the memory) and decrypted within the minimum range in response to a user input, or the meta-data and files may be read out (loaded onto the memory) and decrypted under the restrictions of the memory capacity prior to a user input. In the latter case, the waiting time due to reading out data can be shortened, and the responsiveness of the system to a user input can be enhanced.

In some examples, when saving a file within the virtual drive is requested, the control module may cause the secret splitting module to split the file image of the file at least into two split files using secret splitting. One of the split files may be written into the first storage device, and the other one of the split file may be written into the second storage device. According to such a configuration, every time saving a file within the virtual drive is requested, the file image of the file is split to ensure that the file is protected. In an operation mode in which at least those two split files are immediately written into the first storage device and the second storage device in response to detection of the request for file saving, the time length for which these split files are present on the same device will be minimized allowing to realize strong security.

In some examples, the virtual drive may be generated by registering the settings of the virtual drive onto the file system of the information processing device, and the control module may detect the request for file saving via the file system. According to such a configuration, it is possible to implement, at low cost, a common program interface for receiving a file saving request made from a user or an application triggered by various events without requiring any complicated logic.

The present specification has mainly described examples in which virtual drive meta-data, file meta-data, and a file image are each encrypted and decrypted. However, the present disclosure is not limited to such examples and a part or all of virtual drive meta-data, file meta-data, and a file image may only be split and combined without being encrypted or decrypted. For example, even when virtual drive meta-data is not encrypted or decrypted, it is possible to provide double protection of two layers including file meta-data, and a file. Skipping encryption and decryption can lighten load on the system. Virtual drive meta-data may only be encrypted and written into the external storage device without being split.

The present specification has mainly described examples in which secret data is split into two pieces of split data using secret splitting. However, as described above, secret data within the virtual drive may also be split into any two or more number of pieces of split data. As long as there are a plurality of devices into which a plurality of pieces of split data are written, any of the plurality of pieces of split data may be written into any of the storage devices. For example, as exemplified in FIG. 1C, writing additional split data into a terminal device that can be carried by a user (such as an IC card for employee ID which is carried by an employee of a corporation) can give the terminal device a role as an authentication device for access to secret data. For example, a fragment of split meta-data split from virtual drive meta-data alone may be written into a device having small storage capacity.

5. Modifications (1) File Splitting—First Modification

Figure 10:
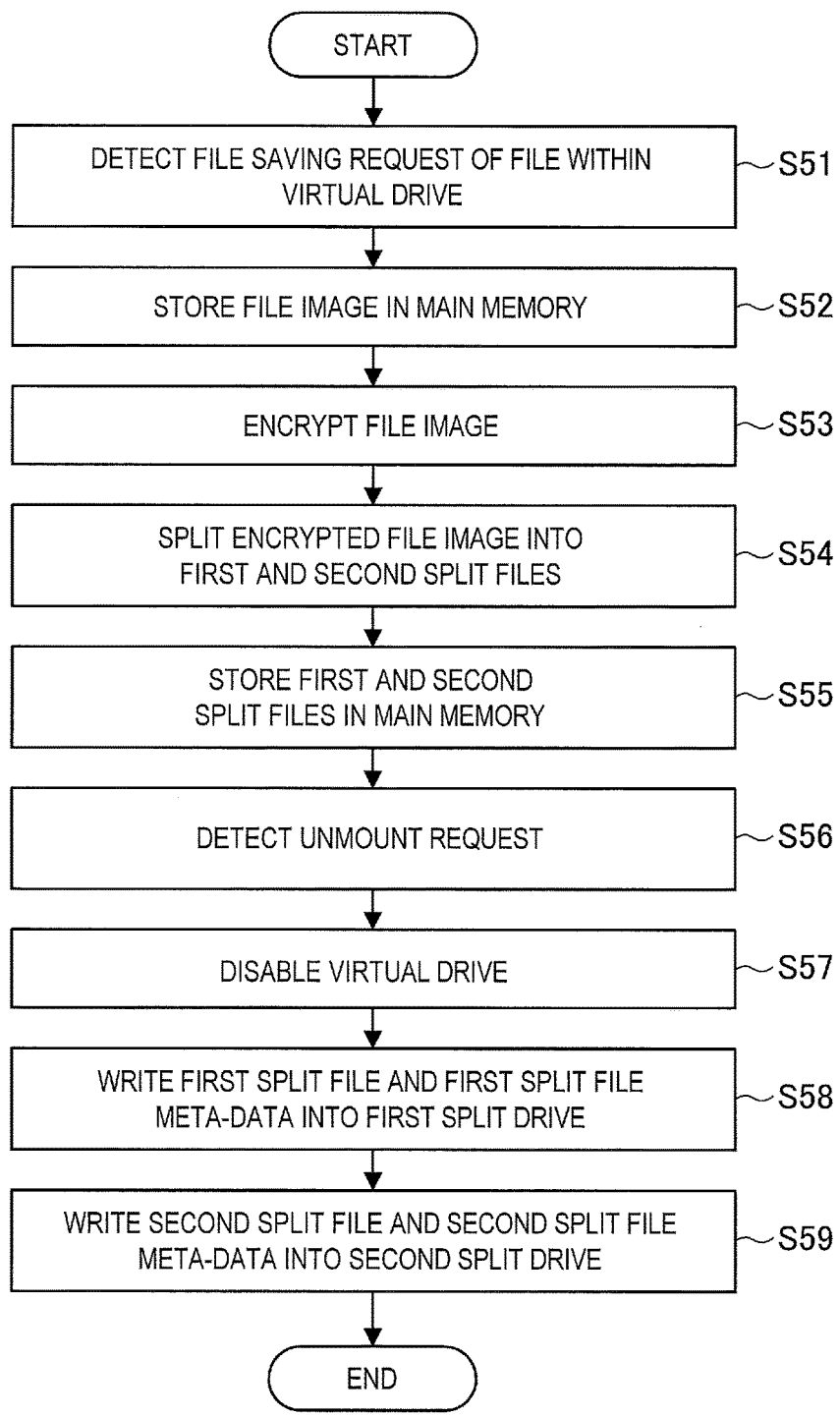
FIG. 10 is a flowchart illustrating a first modification of a flow of file splitting processing for splitting a file using secret splitting.

FIG. 10 is a flowchart illustrating a first modification of a flow of file splitting processing for splitting a file using secret splitting. The file splitting processing illustrated in FIG. 6 is an instance of the processing in the above-described first operation mode (direct mode), while the file splitting processing illustrated in FIG. 10 is an instance of the processing in the above-described second operation mode (cache mode). Steps S51 to S54 in FIG. 10 may be performed similarly to steps S11 to S14 in FIG. 6.

In step S51, the control module 10 detects a file saving request of a file within a virtual drive. Once the file saving request is detected, the control module 10 stores, in step S52, a file image of the file to be saved in the storage area for the virtual drive within the main memory 102. Next, in step S53, the control module 10 causes the secret splitting module 30 to encrypt the file image of the file to be saved within the virtual drive. Next, in step S54, the control module 10 causes the secret splitting module 30 to split the encrypted file image into the first and second split files 91a and 91b. In addition, the control module 10 causes the secret splitting module 30 to encrypt the file meta-data of the file to be saved, and to split the file meta-data into the first split file meta-data 90a and the second split file meta-data 90b.

Next, in step S55, the control module 10 stores the first and second split files 91a and 91b, and the first split file meta-data 90a and the second split file meta-data 90b in the main memory 102. These split files and pieces of split meta-data are not written into the corresponding storage devices at this time.

Afterwards, once a request for unmounting the virtual drive is detected in step S56, the control module 10 disables the virtual drive in step S57. For example, this causes the displayed virtual drive to disappear from the screen. In step S58, the control module 10 writes the first split file 91a and the first split file meta-data 90a into the first split drive 70a. In step S59, the control module 10 writes the second split file 91b and the second split file meta-data 90b into the second split drive 70b. Needless to say, step S58 is performed with the external storage device 400 connected to the information processing device 100 via the connection interface 106.

The file splitting processing illustrated in FIG. 10 then finishes.

(2) File Splitting—Second Modification

Figure 11:
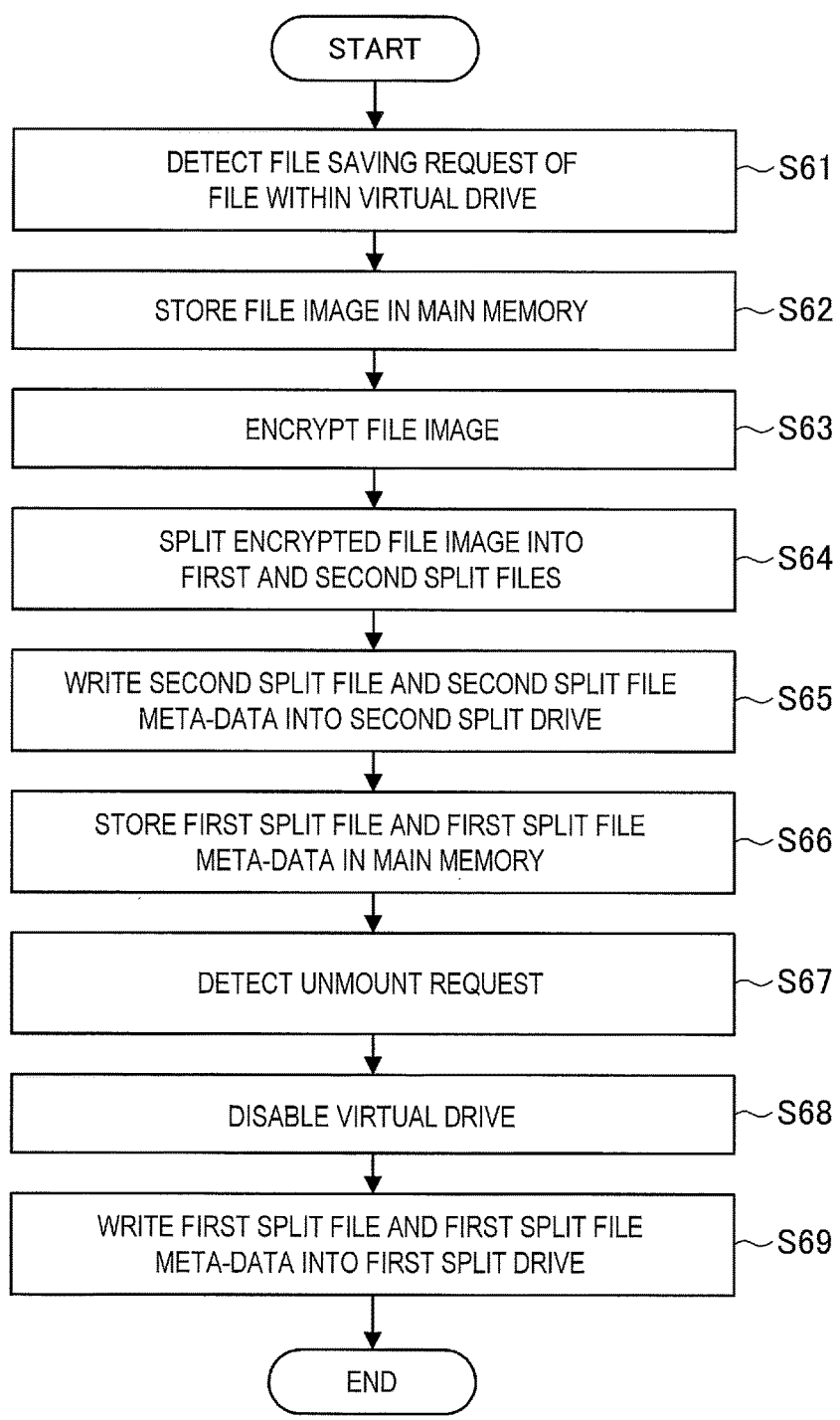
FIG. 11 is a flowchart illustrating a second modification of a flow of file splitting processing for splitting a file using secret splitting.

FIG. 11 is a flowchart illustrating a second modification of a flow of file splitting processing for splitting a file using secret splitting. The file splitting processing illustrated in FIG. 11 is an instance of the processing in the above-described second operation mode (cache mode). Steps S61 to S64 in FIG. 11 may be performed similarly to steps S51 to S54 in FIG. 10.

In step S61, the control module 10 detects a file saving request of a file within a virtual drive. Once the file saving request is detected, the control module 10 stores, in step S62, a file image of the file to be saved in the storage area for the virtual drive within the main memory 102. Next, in step S63, the control module 10 causes the secret splitting module 30 to encrypt the file image of the file to be saved within the virtual drive. Next, in step S64, the control module 10 causes the secret splitting module 30 to split the encrypted file image into the first and second split files 91a and 91b. In addition, the control module 10 causes the secret splitting module 30 to encrypt the file meta-data of the file to be saved, and split the file meta-data into the first split file meta-data 90a and the second split file meta-data 90b.

Next, in step S65, the control module 10 writes the second split file 91b and the second split file meta-data 90b into the second split drive 70b. In step S66, the control module 10 stores the first split file 91a and the first split file meta-data 90a in the main memory 102. The first split file 91a and the first split file meta-data 90a are not written into the external storage device 400 at this time.

Afterwards, once a request for unmounting the virtual drive is detected in step S67, the control module 10 disables the virtual drive in step S68. For example, this causes the displayed virtual drive to disappear from the screen. Next, in step S69, the control module 10 writes the first split file 91a and the first split file meta-data 90a into the first split drive 70a. Needless to say, step S69 is performed with the external storage device 400 connected to the information processing device 100 via the connection interface 106.

The file splitting processing illustrated in FIG. 11 then finishes.

According to the above-described first or second modification, at least writing, into the external storage device 400, of a split file and split file meta-data will be done not at the timing of file saving, but at the timing of unmounting the virtual drive. The external storage device 400 is hereby accessed less frequently, reducing delay in the processing of file saving. The split file and split file meta-data before written into the split drive are maintained on the main memory 102 of the information processing device 100. Thus, even when a user suddenly disconnects the external storage device 400 from the information processing device 100 (without, for example, unmounting the virtual drive), the split file and the split file meta-data are preserved on the main memory 102, thereby preventing the updated content of the file from being lost against the user's will. Once the external storage device 400 is reconnected to the information processing device 100, the latest split file and split file meta-data on the main memory 102 can be written into the split drive of the external storage device 400 again.

The first and second modifications are more advantageous in the scenario in which, for example, the external storage device 400 is wirelessly connected to the information processing device 100. That is because a wireless connection might be relatively frequently interrupted depending on wireless channel conditions (such as signal strength, noise level, and interference from other devices), but the consistency of split files is securely maintained without being affected by the wireless channel conditions in the above-described operation mode. Note that it is not preferable from the perspective of security to maintain a set of split files (such as the first split file 91a and the second split file 91b) on the same device for a long time. Accordingly, the control module 10 may measure time, for example, using a timer, and, when the elapsed time from a disconnection exceeds predefined time period, the control module 10 may erase a split file and split file meta-data on the main memory 102.

(3) Other Modifications

According to another aspect of the present disclosure, there may be provided a computer program which, when executed by a processor of an information processing device, causes the processor to function as: a secret splitting module configured to form a plurality of pieces of split data by splitting secret data using secret splitting; and a control module configured to control reading out or writing each piece of the plurality of pieces of split data from or into a data area of a corresponding storage device, wherein the control module is further configured to maintain the secret data within a virtual drive, wherein the control module is further configured to: in response to detecting a connection of the first storage device to the information processing device, read out at least encrypted virtual drive meta-data for generating the virtual drive from the first storage device; decrypt the virtual drive meta-data; generate the virtual drive based on the decrypted virtual drive meta-data; and when a disconnection of the first storage device from the information processing device is detected, disable the virtual drive. A file image of a file within the virtual drive is split by the secret splitting module at least into a first split file and a second split file, wherein the first split file is to be written into the first storage device, and the second split file is to be written into a second storage device that is different from the first storage device. Corresponding secret management method and information processing system may also be provided.

According to such a configuration, meta-data for generating a virtual drive that provides space for a user to handle secret data is protected at least by encryption. Secret data within the virtual drive is protected by secret splitting. It is thus possible to protect secret data from the risks of leakage with double barriers. It is also possible to tie the life cycle of the virtual drive from generation to disappearance with actions of connecting and disconnecting the external storage device, which can be intuitively grasped by a user.

According to still another aspect of the present disclosure, there may be provided a computer program which, when executed by a processor of an information processing device, causes the processor to function as: a secret splitting module configured to form a plurality of pieces of split data by splitting secret data using secret splitting; and a control module configured to control writing each piece of the plurality of pieces of split data into a data area of a corresponding storage device, wherein the secret data is maintained within a virtual drive of the information processing device, and wherein the control module is further configured to: acquire virtual drive meta-data for generating the virtual drive; generate the virtual drive by registering a setting of the virtual drive onto a file system of the information processing device based on the acquired virtual drive meta-data; detect a file saving request for saving a file handled within the virtual drive via the file system; and when the file saving request is detected, cause the secret splitting module to split a file image of the file to be saved at least into a first split file and a second split file using secret splitting. The first split file is to be written into a first storage device, the first storage device being an external storage device, and the second split file is to be written into a second storage device that is different from the first storage device. Corresponding secret management method and information processing system may also be provided.

According to such a configuration, a file system intervenes between a mechanism of protecting secret data handled on a virtual drive using secret splitting, and applications directly operated by a user. This allows the virtual drive to receive, through a common program interface, a file saving request made from the user or an application triggered by various events, and it is possible to implement the secret splitting technology at low cost without requiring any complicated logic. It is also possible to realize smooth operations of the system without having any modification impact on the applications.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the processes described herein using flowcharts do not necessarily have to be performed in the order described in the flowcharts. Some of process steps may be executed in parallel. An additional process step may also be adopted, and some of process steps may be omitted.

The computer programs described herein are stored in a non-transitory computer-readable medium installed inside or outside the information processing device. Each of those programs is, for example, loaded onto the RAM and executed by the processor when executed. The computer-readable medium may be any type of medium such as a read only memory (ROM), a compact disc (CD), a digital versatile disc (DVD), an HDD, an SSD, a magneto-optical disk, a magnetic disk, a magnetic tape, a cassette tape, a semiconductor memory, or a combination thereof.

What is claimed is:

1. A non-transitory computer-readable medium having embodied thereon a computer program which, when executed by a processor of an information processing device, causes the processor to function as:

a secret splitting module configured to form a plurality of pieces of split data by splitting secret data using secret splitting; and a control module configured to control reading out or writing each piece of the plurality of pieces of split data from or into a data area of a corresponding storage device, wherein the control module is further configured to maintain the secret data within a virtual drive registered on the information processing device, wherein the control module is further configured to:

when saving a file within the virtual drive is requested, cause the secret splitting module to split a file image of the file into a plurality of split files including a first split file to be written into a first storage device that is an external storage device and a second split file to be written into a second storage device that is different from the first storage device and store at least the first split file on a memory of the information processing device; and when unmounting the virtual drive is requested, write the first split file into the first storage device and unmount the virtual drive.

2. The non-transitory computer-readable medium according to claim 1, wherein the control module is further configured to, when a disconnection of the first storage device from the information processing device is detected, unmount the virtual drive but keep the first split file on the memory.

3. The non-transitory computer-readable medium according to claim 2, wherein the control module is further configured to erase the first split file on the memory after an elapsed time from the disconnection exceeds a predefined time period.

4. The non-transitory computer-readable medium according to claim 1, wherein the first storage device is an external storage device that is wirelessly connected to the information processing device.

5. The non-transitory computer-readable medium according to claim 1, wherein the second storage device is a secondary storage device of the information processing device; and the control module is further configured to, when the saving of the file within the virtual drive is requested, write the second split file into the second storage device.

6. The non-transitory computer-readable medium according to claim 1, wherein the control module is further configured to:

when the saving of the file within the virtual drive is requested, write the second split file into the memory of the information processing device; and when the unmounting of the virtual drive is requested, write the second split file into the second storage device.

7. A secret management method performed in an information processing device using secret splitting, the secret splitting being capable of forming a plurality of pieces of split data by splitting secret data, the secret management method comprising:

generating a virtual drive registered on the information processing device, the virtual drive being configured to maintain the secret data therein;

when saving a file within the virtual drive is requested, splitting, using the secret splitting, a file image of the file into a plurality of split files including a first split file to be written into a first storage device that is an external storage device and a second split file to be written into a second storage device that is different from the first storage device and storing at least the first split file on a memory of the information processing device; and when unmounting the virtual drive is requested, write the first split file into the first storage device and unmount the virtual drive.

8. An information processing system comprising:

a secret splitting module configured to form a plurality of pieces of split data by splitting secret data using secret splitting; and a control module configured to control reading out or writing each piece of the plurality of pieces of split data from or into a data area of a corresponding storage device, wherein the control module is further configured to maintain the secret data within a virtual drive registered on an information processing device, wherein the control module is further configured to:

when saving a file within the virtual drive is requested, cause the secret splitting module to split a file image of the file into a plurality of split files including a first split file to be written into a first storage device that is an external storage device and a second split file to be written into a second storage device that is different from the first storage device and store at least the first split file on a memory of the information processing device; and when unmounting the virtual drive is requested, write the first split file into the first storage device and unmount the virtual drive.

* * * * *